United States Patent
Asher

(10) Patent No.: US 7,623,462 B2
(45) Date of Patent: Nov. 24, 2009

(54) ALGORITHM FOR NETWORK ROUTE SELECTION

(75) Inventor: Michael I. Asher, Green Cove Springs, FL (US)

(73) Assignee: AT&T Intellectual Properties II, L.P., Reno, NV (US)

( * ) Notice: Subject to any disclaimer, the term of this patent is extended or adjusted under 35 U.S.C. 154(b) by 345 days.

(21) Appl. No.: 11/818,048

(22) Filed: Jun. 12, 2007

(65) Prior Publication Data

US 2008/0310310 A1  Dec. 18, 2008

(51) Int. Cl.
G06F 15/173 (2006.01)
H04L 12/24 (2006.01)

(52) U.S. Cl. .................. 370/238; 370/255; 709/238
(58) Field of Classification Search .................. None
See application file for complete search history.

(56) References Cited

U.S. PATENT DOCUMENTS

| | | | |
|---|---|---|---|
| 6,044,075 A * | 3/2000 | Le Boudec et al. .......... 370/351 |
| 6,088,333 A * | 7/2000 | Yang et al. .................. 370/238 |
| 6,606,668 B1 * | 8/2003 | MeLampy et al. .......... 709/241 |
| 6,944,131 B2 * | 9/2005 | Beshai et al. ............ 370/238.1 |
| 6,985,959 B1 * | 1/2006 | Lee ............................. 709/238 |
| 7,139,834 B1 * | 11/2006 | Albanese et al. ............ 709/238 |
| 7,146,000 B2 * | 12/2006 | Hollman et al. ........ 379/221.06 |

* cited by examiner

Primary Examiner—Chi H Pham
Assistant Examiner—Soon-Dong D Hyun

(57) ABSTRACT

A method for selecting a path in a physical network that selects nodes for the path based on the coordinates of the nodes in a representation of the subject network in space. From a working node M that is included in the selected path, the next node that is selected for the path is a node N such that (a) a link MN exists, and (b) the link MN forms an angle relative to a line that connects working node with the destination node that is smaller than the angle that any other link from node M forms with the line that connects working node with the destination node.

8 Claims, 2 Drawing Sheets

ALGORITHM FOR NETWORK ROUTE SELECTION

BACKGROUND

This invention relates to networks and, more particularly, to network path selections, or identifications.

Many real-world applications can be viewed to comprise a network that includes nodes that are interconnected by links where, typically, each link has a cost that is associated with traversing the link. The costs of traversing a link in the two directions need not be the same. The typical objective is to identify a path from one node of the network (source node, s) to another node of the network (destination or terminus node, t) that is a least-cost path. This objective is usually achieved by representing the network with a mathematical entity known as a directed graph, or digraph, where nodes, or vertices, of a digraph represent the network links, and edges of the digraph that interconnect the nodes represent network links. The least-cost path problem is solved mathematically on the digraph by employing principles that have been developed by digraphs generally, and the solution is then applied to the network.

The application is, of course, dependent on the network. To give one example, the application may be communications, in which case the network may be the telecommunication network, and the least-cost problem may be the problem of identifying a least-cost route for a call or a plurality of calls. Applying the solution to the network is also dependent on the particular application. It may be providing information for the process of establishing a connection along the least-cost route, re-routing a whole set of existing connections in response to a change in the network because of a failure at some node, or it may be just storing the path information for potential connections that are high priority connections. To give another example, the application may be transporting goods over the highways, in which case the network is the network of highways, the least cost problem often is the problem of identifying the least cost route for moving the goods from city A to city B. In this case, applying the solution to the network may be embodied in the process of giving instructions to a driver to execute the movement of the goods from city A to city B.

The classic algorithm for single-source shortest-path in a digraph with non-negative edge weights is the Dijkstra algorithm. For the above-mentioned goods movement application, for example, the vertices of the digraph graph represent cities, the edge weights represent the driving distances between pairs of cities connected by a direct road, and the Dijkstra's algorithm finds the shortest route between any two cities.

The input of the Dijkstra algorithm consists of a weighted directed graph G and a source vertex s in G. The vertices of G form a set V, and the edges of the graph G form a set E. The algorithm computes the least costly path from the source vertex to each of the other vertices in V. In one implementation, the algorithm maintains two sets of vertices S and Q. Set S contains all vertices for which the least cost path is already known (initially, empty), and set Q contains all other vertices (initially, the entire set of vertices, V). The algorithm also maintains an array d of best estimates of shortest path to each vertex, and an array p of a predecessor for each vertex in Q. For example, if a vertex $u_i$ in Q can be reached from $u_j$, $u_k$, and $u_l$, and the costs are such that reaching node $u_i$ from $u_k$ is the least costly, then the predecessor vertex of $u_i$ is $u_k$.

Set S starts empty, and in each of the algorithm's iterations one vertex is moved from Q to S. The vertex that is chosen is the vertex with lowest cost from the source node.

The algorithm is:
While Q is not empty:
1. Sort the vertices in Q according to the current best estimate of their distance from the source,
2. Select the vertex u in Q with the lowest cost, and add it to S (and delete it from Q),
3. Relax all the vertices still in Q connected to u; that is, compute the cost of extending the path from u to all nodes that are directly reachable from u, and return to step 1.

It is noted that step 1 in the above algorithm sorts all vertices in Q and step 2 chooses the vertex with the smallest cost.

It is quite clear that the running time for finding the lowest cost path from one vertex being the source vertex to another vertex being the destination vertex can vary from one situation to another based on the particular costs that are extant. It can be shown that the Djikstra algorithm has a worst case running time on the order of $V^2$. Since the Djikstra algorithm operates by expanding shortest paths around the source node, worst case performance is common, and for large networks, this can involve significant processing times.

SUMMARY OF THE INVENTION

An advance in the art is realized with a method and apparatus that, for a certain kind of network, employs an algorithm that uses a different criterion for selecting the next node than the criterion used by the Djikstra algorithm. Specifically, the disclosed algorithm selects the next node based on the coordinates of the node in a representation of the subject network in space. More specifically, from a working node M that is included in the selected path, the next working node that is selected for the path is a node N such that (a) a link from node M to node N exists, and (b) the link from node M to node N forms an angle relative to a line that connects the working node with the destination node that is smaller than the angle that any other link from node M forms with the line that connects the working node with the destination node.

DETAILED DESCRIPTION

Many real-world networks, such as the telecommunication network, possess attributes that are not recognized by digraphs. For instance, the shortest path in a telecommunication network from Chicago to New York is unlikely to run through Los Angeles. Similarly, in a network of streets and roads, the quickest route between two points in a city is likely to remain in or very near that city. For purposes of this disclosure, any network (graph) that can be oriented in space so that the distance between vertices correspond, even if just approximately, to the costs of moving between the vertices, is termed herein a Euclidian graph, or network. Often such networks can be oriented in 2-dimensional space, but the principles disclosed herein apply to w-dimensional space.

An advance in the art is achieved by taking advantage of the position of nodes in the space of the Euclidian network, recognizing that the solution might not be optimum but is likely to be quite satisfactory. Typically, the algorithm disclosed herein is considerably faster than the Djikstra algorithm.

Figure 1:
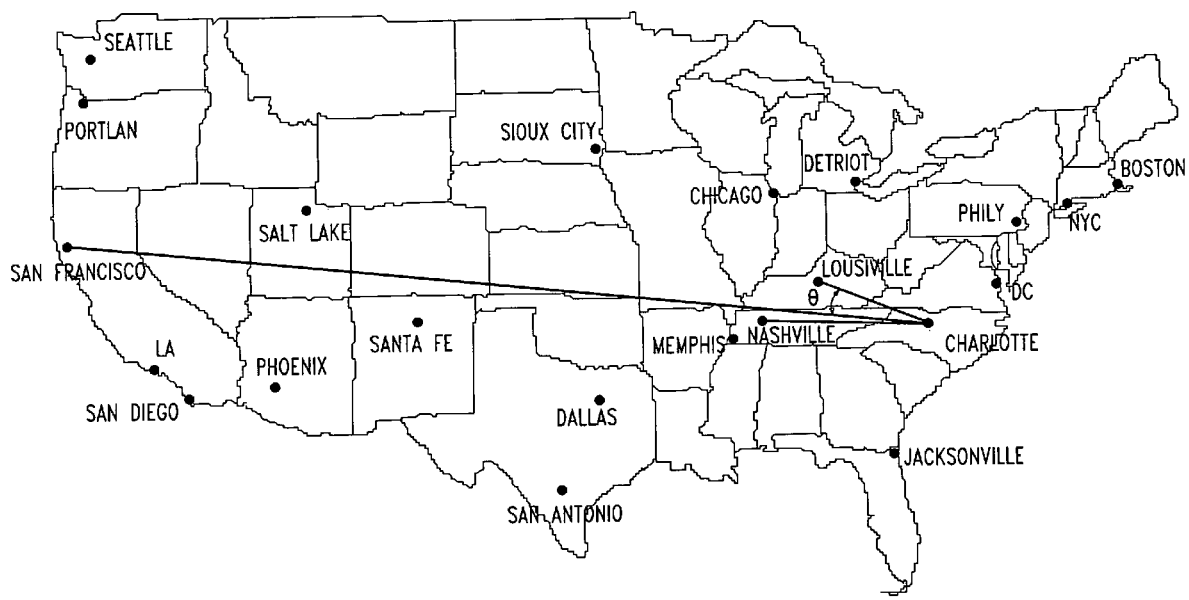
FIG. 1 presents a network with nodes and links, and illustrates the principles disclosed herein for selecting nodes in the course of identifying a least cost path.

FIG. 1 depicts an illustrative telecommunication network of nodes, and links between the nodes, which corresponds to the telecommunications network of mainland United States, with the assumption that to a fair degree of approximation the cost of traversing the network corresponds to the lengths of the links between the nodes. In other words, the FIG. 1 network is a Euclidian network.

Figure 2:
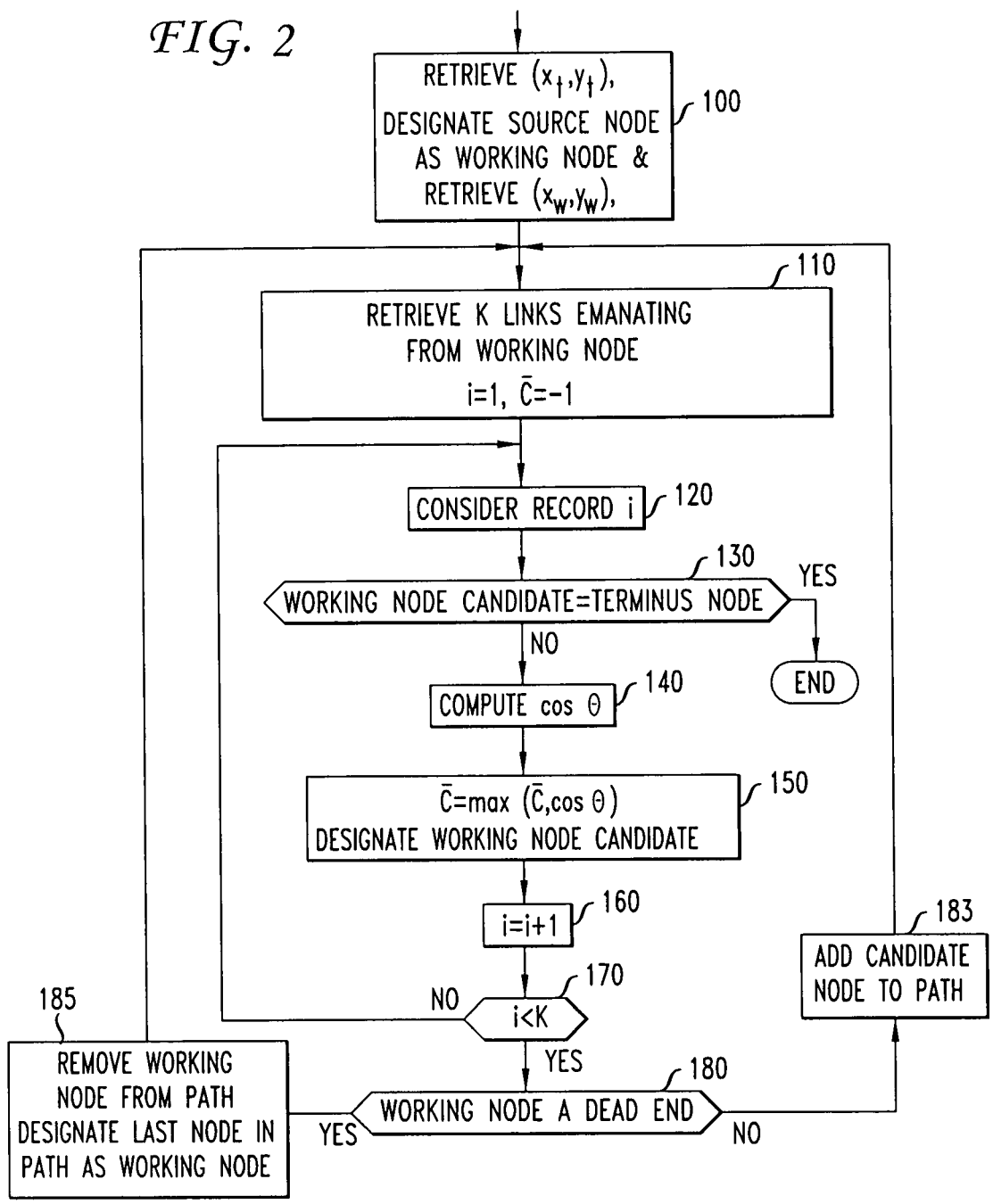
FIG. 2 depicts a flow chart in accord with the principles disclosed herein.
Figure 3:
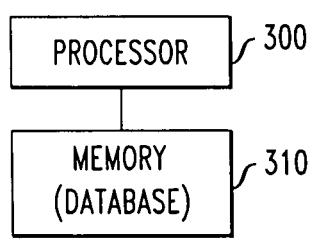
FIG. 3 illustrates a processor arrangement where the disclosed method may be practiced.

Illustratively, the question that needs to be resolved is what is the least cost path from source node Charlotte (NC) to destination node San Francisco (CA), and FIG. 2 presents a flowchart of the method for identifying that path, the method being executed on processor 300, shown in FIG. 3, that has access to a database 310 of all of the links in the network. Illustratively, the records within the database have the form:

| beginning node | $x_1, y_1$ | Ending node | $x_2, y_2$ | A |
|---|---|---|---|---|

That is, the first field identifies the source node of the link (e.g., Charlotte), the second field $(x_1, y_1)$ specifies the geographical coordinates of the link's source node, the third field specifies the destination node of the link (e.g., Nashville), the fourth field $(x_2, y_2)$ specifies the geographical coordinates of the link's destination node, and the fifth field (A) specifies the cost of traversing the link (that is, from Charlotte, to Nashville). It is noted that in the context of a Euclidian network/graph, the cost A corresponds to the magnitude of the vector from Charlotte to Nashville; i.e., from $(x_1, y_1)$ to $(x_2, y_2)$.

Not unlike the Djikstra algorithm, the process disclosed herein and shown in FIG. 2, begins at the source vertex and proceeds toward the destination in a stepwise fashion.

At step 100 the process begins by obtaining from the database the geographical coordinates of the terminus node t (San Francisco), i.e., $(x_t, y_t)$, designating the source node s (Charlotte) as the working node, and retrieving from the database the coordinates of the working node $(x_w, y_w)$. In step 110 that follows, all links that emanate from the working node are retrieved from database 210, thus forming a set of K links, and in preparation for the process of selecting the next working node, index i is set to 1 and a ceiling for cos θ—which is discussed below—, $\overline{C}$, is set to −1.

In accord with the principles of this disclosure, the node that is selected as the next working node is the node that forms the smallest angle θ between line from the current working node to the selected node and the line from the current working node to the terminus node (as compares to the angle that would result by selecting any other node). FIG. 1 shows the angle θ when San Francisco is the terminus node, Charlotte is the working node and Louisville is the next working node candidate.

It is quite clear that when the origin is considered to be at the working node, a vector $v_1$ from the origin to the terminus node is represented by $(x_t-x_w, y_t-y_w)$, and a vector $v_2$ from the origin to the next working node candidate is represented by $(x_c-x_w, y_c-y_w)$ where $(x_c, y_c)$ are the coordinates of the candidate node. By definition, the dot product of vectors $v_1$ and $v_2$ is $v_1 \cdot v_2 = |v_1||v_2|\cos θ$, where θ is the angle between the vectors, and in accordance with the approach stated above, it is desired to identify a working node candidate—i.e., vector $v_2$—that yields the smallest θ. The angle θ can be obtained from the equation below $$\theta = \cos^{-1} \frac{v_1 \cdot v_2}{|v_1||v_2|} \quad (1)$$

but obtaining θ from the arccosine cannot be done in closed form. While θ can be obtained from equation (1) by means of a table lookup, it is noted that the cosine of an angle is inversely but monotonically related to the magnitude of the angle. That is, as θ approaches 0, cosine θ approaches 1, which means when comparing two cosine values, selecting the larger value is tantamount to selecting the smaller angle. Hence, in accord with one embodiment of the disclosed method, the working node candidate that is selected as the next working node is the candidate that has the largest cosine value. As noted above, $|v_2|=A$, and it is also noted that $|v_1|$ corresponds to the magnitude of the line from the working node to the terminus node, B. Therefore, what is sought is the candidate node with the largest $$\cos\theta = \frac{v_1 \cdot v_2}{AB} \quad (2)$$
$$= \frac{(x_t - x_w)(x_c - x_w) + (y_t - y_w)(y_c - y_w)}{AB}.$$

In comparing two cos θ terms it is noted that value B is the same and, therefore, the comparison may be simply of ratios $$\cos\theta = \frac{(x_t - x_w)(x_c - x_w) + (y_t - y_w)(y_c - y_w)}{A}. \quad (3)$$

At step 120, the processor selects for consideration record i from the set of K entries that were retrieved from the database, and passes control to step 130 where it is determined whether the considered record corresponds to the terminus node. If so, the process ends. Otherwise, control passes to step 140 where the computer computes cos θ according to equation (2) and passes control to step 150. At step 150, if cos θ> $\overline{C}$ then $\overline{C}$ is made equal to cos θ, and the node of the considered record (found in the third field of the record) is designated as the working node candidate. Otherwise $\overline{C}$ is left unchanged.

At step 160 the index i is incremented, and in step 170 that follows a determination is made whether i is less than K. If so, control passes to step 120 where another record (link) is considered.

It is recognized that a node X might be reached and considered in steps 10 et seq. that is a dead end in the sense that all other links that emanate from node X effectively go backwards, which is indicated by the fact that cos θ is negative. This dead end situation is ameliorated by a back tracking and "tree pruning" approach. Simply described, if in a path A→B→C→D it is discovered where node D is a dead end node, the method backtracks to the previous node, C, deletes node D from further consideration, and tries to find another node that is coupled to node C and is not a dead end node. This is realized by control passing to step 180 when i is not less than K, where a decision is made whether the working node is a dead end node. If it is not, the candidate node is added to the path in step 182 and control is passed to step 110. Otherwise, step 185 removes the working node from the path and also from further consideration, the immediately previous node in the path is designated the working node, and control also is passed to step 110.

The invention claimed is:

1. A method executed in a processor for assisting in operating an enterprise which employs a network that includes nodes and links between various pairs of said nodes, where in the course of operating the enterprise a path is to be identified which begins at a chosen one of said nodes, it being a source node, and ends at another chosen one of said nodes, it being a terminus node, and where a representation of the network is stored in a database accessible to said processor, said representation including coordinates assigned to said nodes such that distance computed from said coordinates between each node pair that shares a link corresponds, to within a preselected approximation factor, to cost of traversing the link, and a representation of said network is stored in a database, comprising the steps of:

designating the source node as a working node, and including in said memory information that includes the working node in said path, designating a node as a next working node, and including in said memory information that includes the designated node in said path, where the designated node is a node of said network that shares a connecting link with the working node and the coordinates of the designated node are such that a line from the working node to the designated node forms the smallest angle with a line from the working node to the terminus node, relative to angles of all other nodes that share a link with the working node; and repeating the step of designating a working node as the next node until the designated node is the terminus node.

2. A method executed in one or more processors of for operating an enterprise which employs a network that includes nodes, and links, where each link connects one of said nodes to another of said nodes, traversing a link has an associated cost, the nodes are characterized by coordinates in w-space, where w is greater than 1, and the coordinates are such that a distance between two of said nodes that share a link is indicative of said cost of traversing the link, and where in the course of operating the enterprise a path that begins at a source node and ends at a terminus node is to be identified, comprising the steps of:

(a) obtaining coordinates of the terminus node;

(b) designating the source node as a working node, and (c) including the working node in said path, setting a high water mark ceiling at an initial level, identifying all links emanating from the working node, of which there are K, and in connection with each link i of said K links, where $1 < i \leq K$, identifying a node i of said nodes at which link i terminates;

(d) selecting link i for consideration, where the selected link i has not been previously selected and, if node i is the terminus node proceeding to step (h) but otherwise, evaluating cosine of an angle existing between a line extending from the working node to the terminus node and a line extending from the working node to node i;

(e) if the evaluated cosine is larger than the high water mark, setting the high water mark to the evaluated cosine and associating information pertaining to node i with the high water mark;

(f) returning to step (d) to select another link of said K links, unless all K links have been considered, in which case proceeding to step (g);

(g) designating the node about which information is associated with the high water mark as the working node, and returning to step (c);

(h) storing the set of the nodes that have been designated as working nodes, or the selected links that terminate as the working nodes as said path to be identified to operate said enterprise.

3. The method of claim 2 where said identifying all links emanating from the working node includes retrieving from a database records pertaining to said links.

4. The method of claim 3 where each record includes identifies the link by at least the coordinates in said w-space of a node of said network where the link terminates.

5. The method of claim 4 where each record includes a distance measure of the link.

6. The method of claim 2 where said evaluating cosine of an angle calculates $$\cos\theta = \frac{(x_t - x_w)(x_c - x_w) + (y_t - y_w)(y_c - y_w)}{AB}$$

where $x_t$ and $y_t$ are coordinates of the terminus node, $x_w$ and $x_w$ are coordinates of current working node, $x_c$ and $x_c$ are coordinates of said node i, B is length of the line extending from the current working node to the terminus node, and A is length of the line extending from the current working node to said node i.

7. The method of claim 6 retrieving said path from said memory, and employing said path in operating said enterprise.

8. A method executed in a processor for selecting a path in a telecommunications network from a first geographically fixed node of said network to a second geographically fixed node of said network comprising the steps of:

a) designating the first node as a working node and as a member of a set that defines said path;

b) designating a node of said network as a next working node and as a member of said set, where the designated node is a node of said network that shares a connecting link with the working node, and a line from geographical coordinated of the working node to geographical coordinated of the designated node forms the smallest angle with a line from said geographical coordinated of the working node to said geographical coordinated of the terminus node, relative to angles of all other nodes that share a link with the working node; and repeating the step of designating a working node as the next node until the designated node is the terminus node.

* * * * *